(12) United States Patent
Behrbaum et al.

(10) Patent No.: US 11,457,048 B2
(45) Date of Patent: Sep. 27, 2022

(54) USER SELECTABLE DOCUMENT STATE IDENTIFIER MECHANISM

(71) Applicant: Microsoft Technology Licensing, LLC, Redmond, WA (US)

(72) Inventors: Todd Smith Behrbaum, Mercer Island, WA (US); Samer Sawaya, Snoqualmie, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 232 days.

(21) Appl. No.: 16/414,146

(22) Filed: May 16, 2019

(65) Prior Publication Data

US 2020/0366722 A1 Nov. 19, 2020

(51) Int. Cl.

| | |
|---|---|
| *G06F 16/93* | (2019.01) |
| *H04L 65/401* | (2022.01) |
| *G06F 9/451* | (2018.01) |
| *G06F 16/176* | (2019.01) |
| *G06F 40/10* | (2020.01) |
| *G06F 3/0481* | (2022.01) |
| *G06F 3/04847* | (2022.01) |
| *H04L 67/10* | (2022.01) |

(52) U.S. Cl.
CPC ........ *H04L 65/4015* (2013.01); *G06F 3/0481* (2013.01); *G06F 3/04847* (2013.01); *G06F 9/451* (2018.02); *G06F 16/176* (2019.01); *G06F 16/93* (2019.01); *G06F 40/10* (2020.01); *H04L 67/10* (2013.01)

(58) Field of Classification Search
CPC .. G06F 16/176; G06F 3/0481; G06F 3/04847; G06F 40/166; G06F 9/451; G06F 16/93; G06F 40/10; H04L 67/10; H04L 29/06; H04L 29/08; H04L 65/4015
See application file for complete search history.

(56) References Cited

U.S. PATENT DOCUMENTS

| | | | | |
|---|---|---|---|---|
| 10,628,631 | B1* | 4/2020 | Smuda | G06F 40/14 |
| 2007/0186187 | A1* | 8/2007 | Strope | G06F 3/0481 |
| | | | | 715/833 |
| 2014/0201131 | A1* | 7/2014 | Burman | G06F 40/10 |
| | | | | 707/608 |
| 2014/0278662 | A1 | 9/2014 | Reed et al. | |
| 2015/0206446 | A1* | 7/2015 | Gupta | G09B 5/08 |
| | | | | 434/362 |
| 2016/0344678 | A1* | 11/2016 | MacDonald | H04L 51/18 |
| 2017/0269805 | A1 | 9/2017 | DeMaris et al. | |
| 2018/0052587 | A1* | 2/2018 | LaPier | G06F 40/166 |

(Continued)

OTHER PUBLICATIONS

"International Search Report and Written Opinion Issued in PCT Application No. PCT/US20/028036", dated Jul. 21, 2020, 8 Pages.

*Primary Examiner* — Jonathan A Bui
*Assistant Examiner* — Kidest Mendaye
(74) *Attorney, Agent, or Firm* — Christopher J. Volkmann; Kelly, Holt & Christenson, PLLC

(57) ABSTRACT

A sharing system generates a user interface mechanism that can be actuated by a user, authoring a document. The user interface mechanism allows the user to set a completeness level corresponding to the document. The completeness level is then associated with the document so that, when the document is shared, the completeness level can be displayed to the recipient of the shared document.

18 Claims, 14 Drawing Sheets

(56) References Cited

U.S. PATENT DOCUMENTS

| | | | |
|---|---|---|---|
| 2018/0268372 A1* | 9/2018 | Bussiek | G06F 3/04815 |
| 2018/0357333 A1* | 12/2018 | Isherwood | G06F 16/901 |
| 2019/0138589 A1* | 5/2019 | Udell | G06F 40/18 |
| 2019/0340562 A1* | 11/2019 | Tayal | G06F 3/0481 |
| 2019/0370749 A1* | 12/2019 | Milvaney | G06Q 10/103 |
| 2020/0279621 A1* | 9/2020 | Degenaro | G06F 40/30 |

* cited by examiner

FIG. 5

USER SELECTABLE DOCUMENT STATE IDENTIFIER MECHANISM

BACKGROUND

Computer systems are currently in wide use. Some computer systems allow users to generate and manage content. These types of computer systems can be hosted systems that host a content creation service and/or a content management service. They can also be client-based systems that allow users to generate content on client computing systems.

Similarly, these computing systems can include sharing functionality which can be invoked by the user in order to share created content with one or more other users. Sharing systems expose functionality to users that allow users to share documents or created content with other users. In doing so, the sharing systems often expose a user interface that allows a user to select recipients of the content to be shared.

It is not uncommon for users to share content documents that are in various stages of preparation. For instance, it is not uncommon for a user to share a rough draft of a document with other users to seek their comments, collaboration, or other input. Similarly, it is not uncommon for a user to share a final draft or revised draft of the same document with the same or different users.

The discussion above is merely provided for general background information and is not intended to be used as an aid in determining the scope of the claimed subject matter.

SUMMARY

A sharing system generates a user interface mechanism that can be actuated by a user, authoring a document. The user interface mechanism allows the user to set a completeness level corresponding to the document. The completeness level is then associated with the document so that, when the document is shared, the completeness level can be displayed to the recipient of the shared document.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIGS. 4-7 show examples of user interface displays that can be generated with mechanisms that allow a user to set a completeness level of a content document.

DETAILED DESCRIPTION

Figure 1:
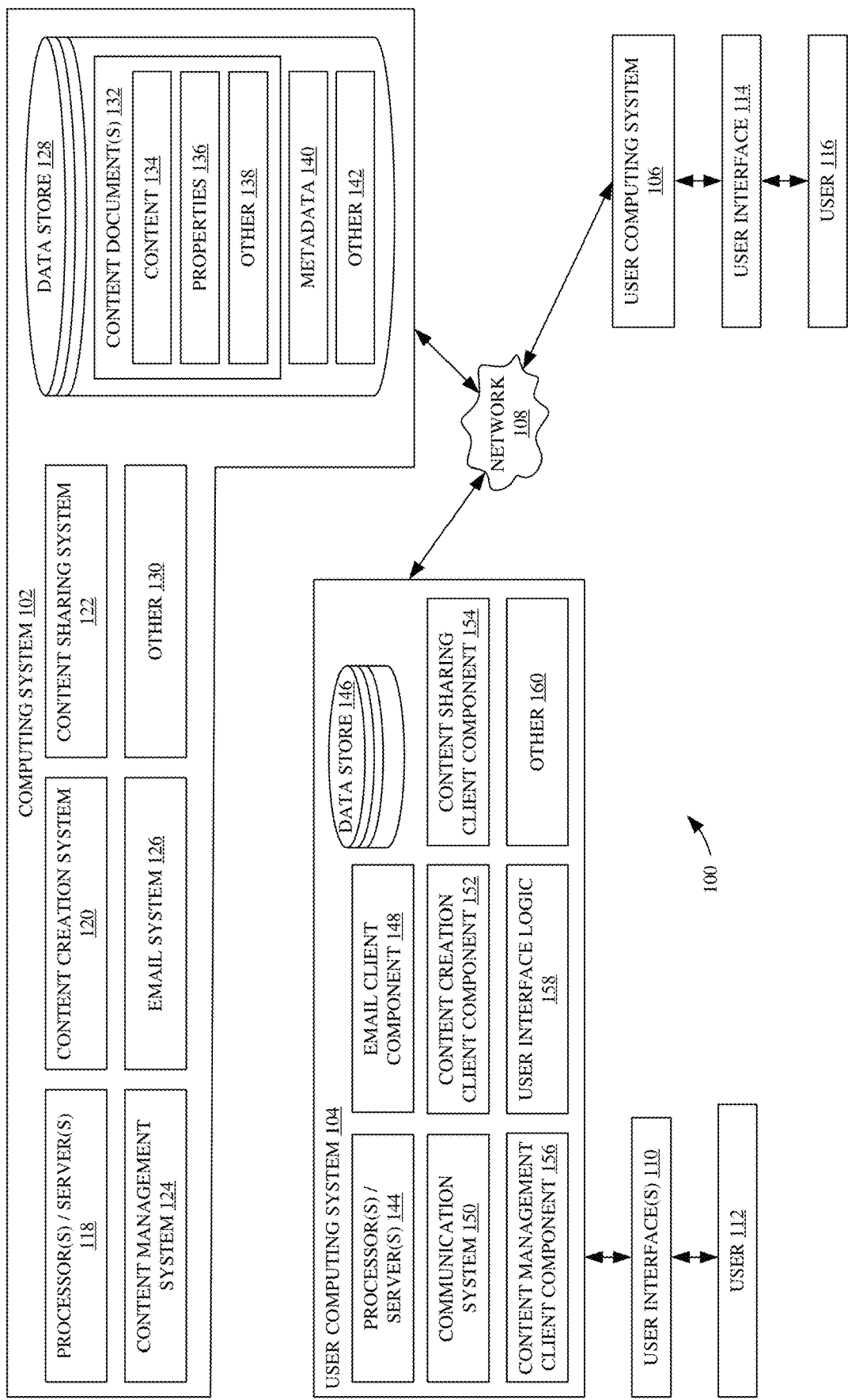
FIG. 1 is a block diagram of one example of a computing environment in which content creation and sharing functionality is provided.

FIG. 1 is a block diagram of one example of a computing system architecture 100. Architecture 100 illustratively includes computing system 102 that is connected to a plurality of different user computing systems 104-106 over a network 108. Network 108 can be a local area network, a wide area network, a near field communication network, a cellular communication network, or a wide variety of other networks or combinations of networks.

User computing system 104 illustratively exposes user interfaces 110 for interaction by user 112. User 112 illustratively interacts with user interfaces 110 in order to control and manipulate user computing system 104 and some parts of computing system 102.

Similarly, user computing system 106 illustratively exposes user interfaces 114 for interaction by user 116. User 116 illustratively interacts with user interfaces 114 in order to control and manipulate user computing system 106 and portions of computing system 102.

In one example, users 112 and 116 can use user computing systems 104 and 106, respectively, to interact with computing system 102 in order to create, modify and manage content documents. Those documents can be word processing documents, slide presentation documents, spreadsheet documents, among a wide variety of other documents. Also, in one example, computing system 102 illustratively exposes sharing functionality so that users 112 and 116 can share content documents with one another. Similarly, computing system 102 illustratively allows users 112 and 116 to communicate with one another using electronic mail communication, messaging communication, or other communication. Thus, when user 112 uses sharing functionality to share a document with user 116, it may be that user 116 is notified that a document has been shared, through the e-mail system, or another messaging system. The notification message may also include a link to the shared document, an indication of the document's completeness level (as described below) and/or it may include the document itself.

Thus, in the example shown in FIG. 1, computing system 102 illustratively includes one or more processors or servers 118, content creation system 120, content sharing system 122, content management system 124, electronic mail (e-mail) system 126, one or more data stores 128, and it can include a wide variety of other items 130. The various systems in computing system 102 illustratively expose interfaces that can be accessed by user computing systems 104-106 over network 108. Thus, content creation system 120 can expose interfaces that allow users 112 and 116 to create and modify content documents. Content sharing system 122 exposes interfaces that allow users 112 and 116 to share content with one another. Content management system 124 exposes interfaces that allow users 112 and 116 to manage content, and e-mail system 126 exposes interfaces that allow users 112 and 116 to communicate with one another using e-mail.

Data store 128 can include a wide variety of different types of content documents 132. Each of those documents can include the content 134, itself, document properties 136 which define certain aspects of the corresponding content document 132, and they can include a wide variety of other items 138. Data store 128 can also include metadata 140, which may be data corresponding to each of the content documents 132 that defines further aspects of the content documents. Data store 128 can include a wide variety of other items 142 as well.

User computing systems 104 and 106 can be similar or different. For purposes of the present discussion, it will be assumed that they are similar so that only user computing system 104 is described in more detail. This, however, is just one example.

In the example shown in FIG. 1, user computing system 104 illustratively includes one or more processors or servers 144, data store 146, e-mail client component 148, communication system 150, content creation client component 152, content sharing client component 154, content management client component 156, user interface logic 158, and it can include a wide variety of other items and functionality 160. E-mail client component 148 can be a client component that interacts with e-mail system 126 at remote computing system 102. Communication system 150 illustratively allows user computing system 104 to communicate over network 108. Therefore, system 150 may vary, depending on the type of network or combination of networks over which user computing system 104 is configured to communicate. Content creation client component 152 can be a client component that interacts with content creation system 120. Content sharing client component 154 can be a client component that interacts with content sharing system 122. Similarly, content management client component 156 can be a client component that interacts with content management system 124. User interface logic 158 illustratively generates user interfaces 110 and detects user interactions with interfaces 110. An indication of such interactions can be communicated to other items on user computing system 104 and/or computing system 102.

It will be noted that some of the items (systems, components, etc.) in computing system 102 may not necessarily have a client component, and interaction between user computing system 104 and those systems or components may be performed in other ways. Alternatively, some of the systems on client computing system 102 may not be needed or the functionality may reside on the user computing systems 104-106 and communication may be made through computing system 102 or otherwise.

The present description shows the items distributed among the various computing systems 102, 104 and 106 as an example only. Other configurations and architectures are contemplated herein.

Briefly, in operation, user 112 may use content creation client component 152 to access the functionality of content creation system 120. In doing so, user 112 may begin an initial draft of a document. User 112 may then wish to share that document with user 116. In that case, user 112 uses content sharing client component 154 to interact with the functionality of content sharing system 122. Component 154 exposes an interface that allows user 112 to indicate which different users he or she wishes to share the content with, and also a completeness level input mechanism that allows user 112 to indicate how complete the content document is, when it is shared. For instance, it may be that this is a first draft of the document and user 112 wishes user 116 to review it and provide comments. In another example, this may be an approved or final draft of a document and user 112 may simply wish user 116 to be aware of it. These are only two examples of completeness levels.

Once the completeness level for the content document is set, user 112 can actuate a sharing user input mechanism and the functionality in content sharing system 122 will indicate to user 116 that the content document has been shared. This may be done by invoking the functionality of e-mail system 126 to send an e-mail message from user 112 to user 116 indicating that the document has been shared. The e-mail message may contain the document, itself, as an attachment. It may contain a link to the document, or it may contain other identifying information. The message may also include a completeness indicator that indicates the completeness level of the document, along with instructions or other information indicating a desired action. For instance, the message may include a link to the document along with a completeness indicator indicating that this is a first draft of the document, and instructions instructing user 116 that user 112 wishes to receive comments on the document. This is just one example and others are described in greater detail below.

Figure 2:
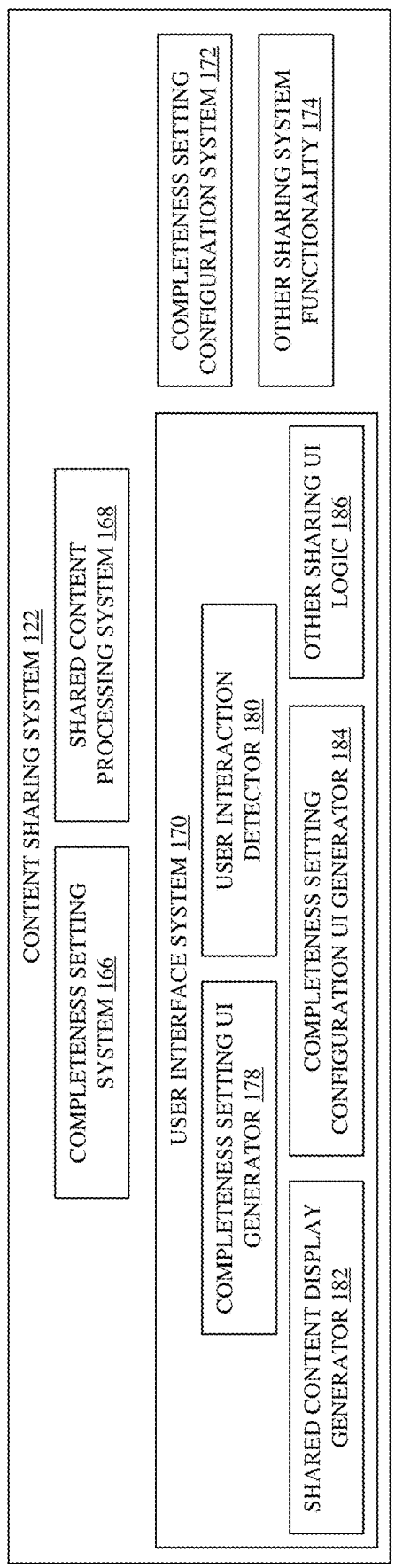
FIG. 2 is a block diagram showing one example of a content sharing system, in more detail.

FIG. 2 is a block diagram showing one example of content sharing system 122 in more detail. Content sharing system 122 illustratively includes completeness setting system 166, shared content processing system 168, user interface system 170, completeness setting configuration system 172, and it can include a wide variety of other sharing system functionality 174. User interface system 170 includes completeness setting UI generator 178, user interaction detector 180, shared display content generator 182, completeness setting configuration UI generator 184, and it can include a wide variety of other sharing UI logic 186.

For purposes of the present example, it is assumed that user 112 is generating content using content creation system 120. When sharing is invoked by user 112, completeness setting system 166 illustratively controls completeness setting UI generator 178 in order to generate a completeness setting user interface mechanism. User 112 illustratively actuates this mechanism in order to set a completeness level corresponding to the document being created.

Also, in one example, the completeness levels may be pre-defined. In another example, they may be user-configurable, or configurable by an administrative user or otherwise configurable. For example, it may be that a user may wish to set a completeness level for a document as "first draft" but then add custom language to describe the completeness level or the actions desired from the recipients, once the document is shared. In scenarios in which the completeness level is configurable, completeness setting configuration system 172 illustratively controls completeness setting configuration UI generator 184 to generate a completeness level configuration user interface mechanism. This may allow the user, an administrative user, or another user, to modify the completeness levels that can be assigned to a content document, as well as to modify the description corresponding to that completeness level, the instructions or actions that are sought in response to sharing the document, or to allow a user to configure the completeness setting system in other ways.

Content sharing system 122 also displays items that are shared with user 112, from other users, such as user 116. For instance, assume that user 116 has generated a content document, assigned a completeness level, and shared it with user 112. In that case, shared content processing system 168 receives an indication that a message has been sent to user 112 with a link to a shared document. Shared content processing system 168 can identify the completeness level of the shared document and control shared content display generator 182 to display the link (or the shared content document itself) to user 112. It can also control generator 182 to display the completeness level and corresponding instructions or other message, corresponding to the shared content document.

Figure 3A:
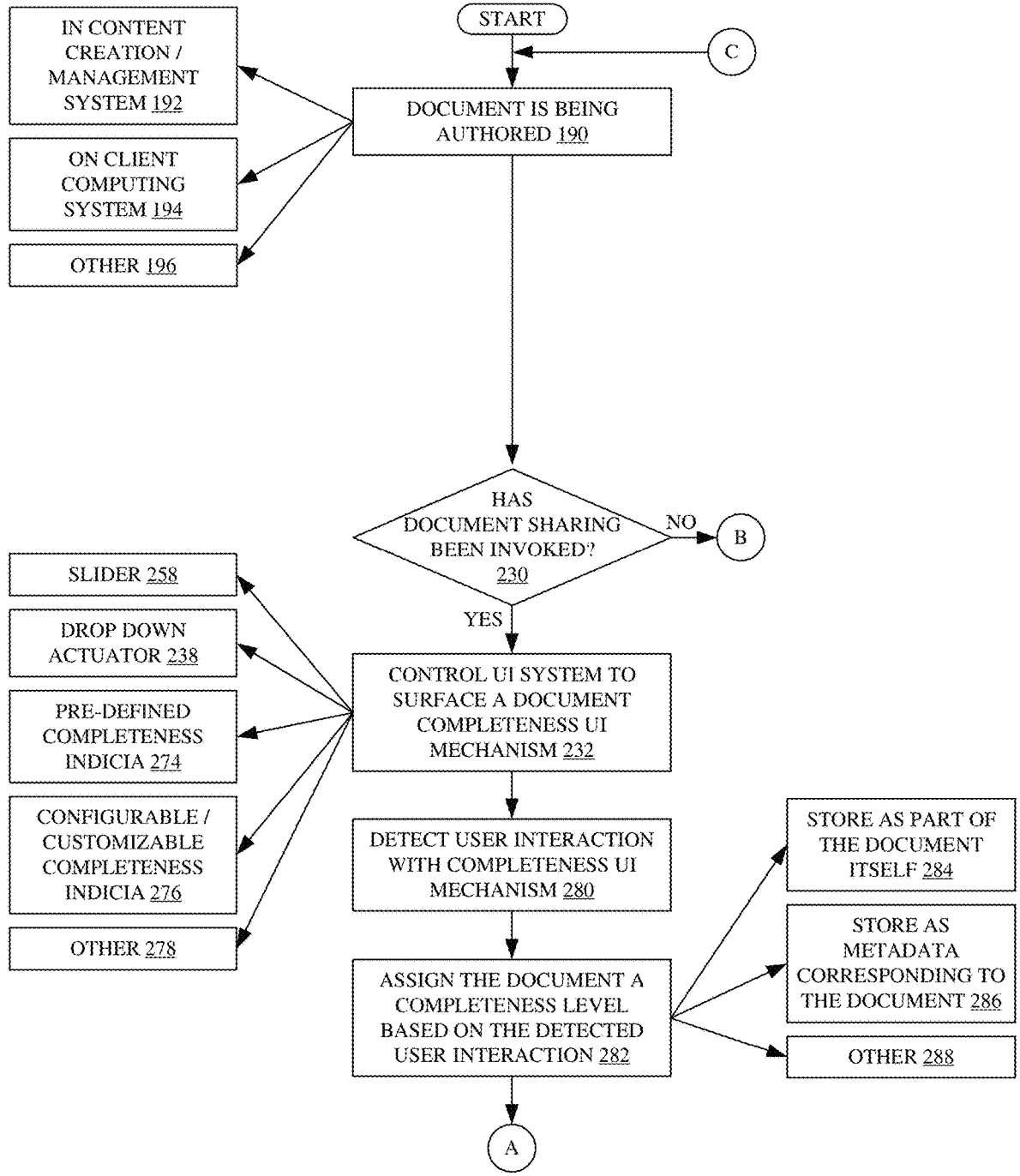
FIGS. 3A and 3B (collectively referred to as FIG. 3) illustrate a flow diagram showing one example of the operation of the content sharing system in exercising functionality that allows a user to set a completeness level corresponding to a content document.
Figure 3B:
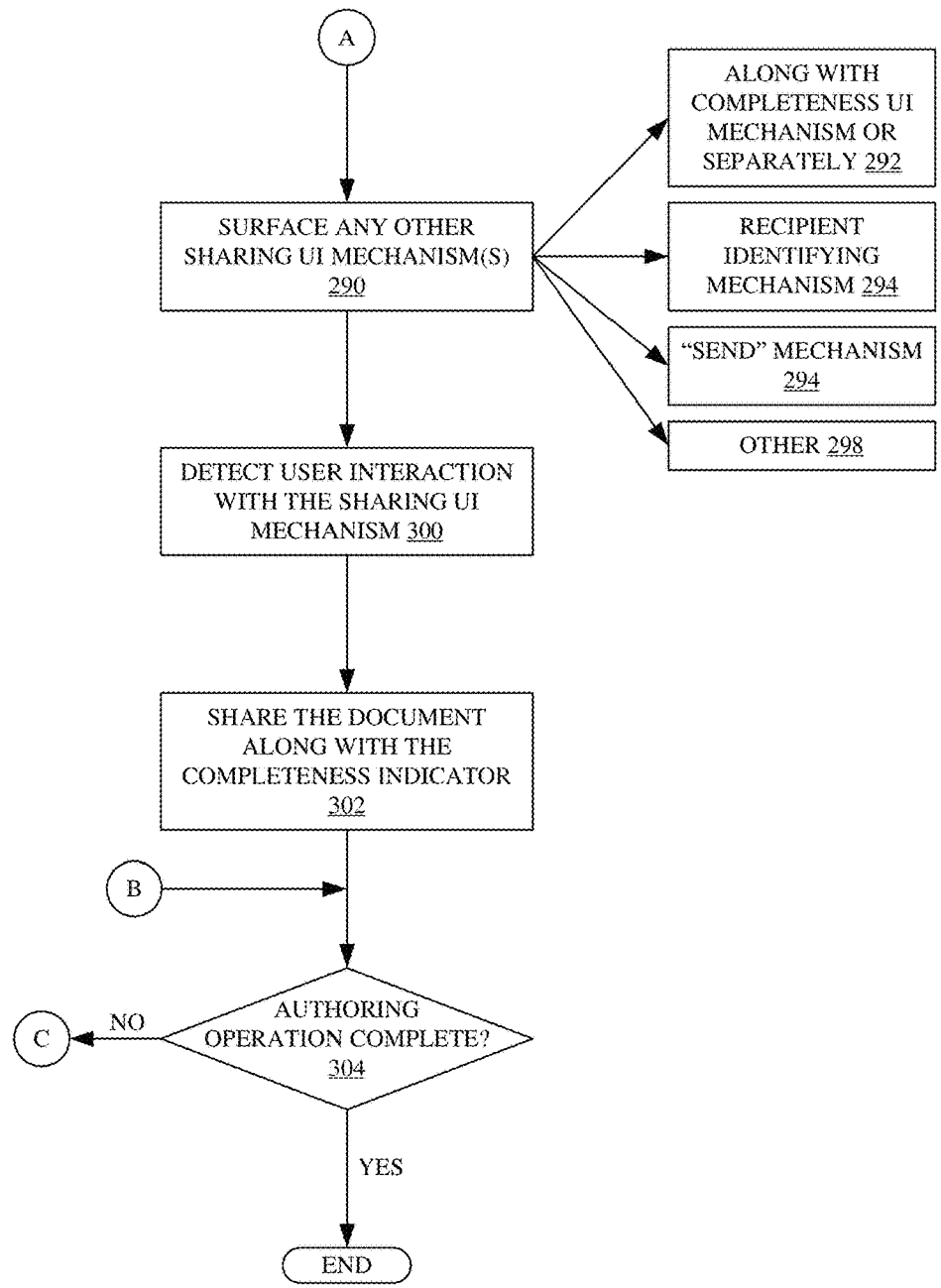

FIGS. 3A and 3B (collectively referred to herein as FIG. 3) illustrate a flow diagram showing one example of the operation of architecture 100 in allowing user 112 to generate content, assign a completeness level and share it with another user (such as user 116). FIGS. 4-7 show examples of user interface displays, with user input mechanisms, that can be generated during the content generation and sharing operation. FIGS. 3-7 will now be described in conjunction with one another.

It is first assumed that user 112 is authoring, or otherwise creating or modifying a content document. This is indicated by block 190 in the flow diagram of FIG. 3. As discussed above, this can be done by using user computing system 104 to access content creation system 120 in computing system 102. This is indicated by block 192. It can also be done by using a client-based content creation system on user computing system 104. This is indicated by block 194. The content document can be created or modified in other ways as well, and this is indicated by block 196.

Figure 4:
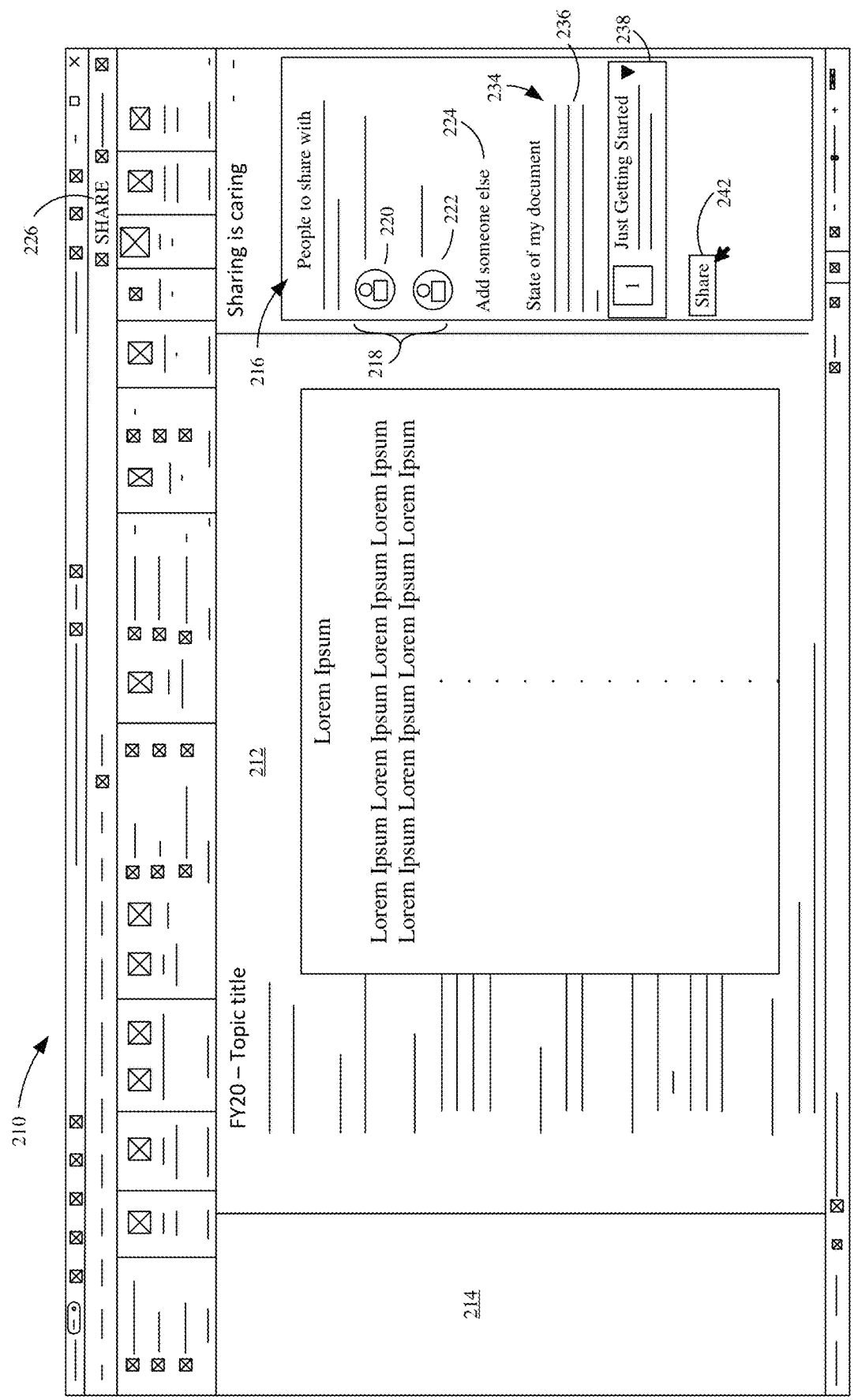

FIG. 4 shows one example of a user interface display 210. It can be seen in FIG. 4 that a content document 212 is being authored in authoring pane 214 of user interface 210. FIG. 4 shows that, in one example, user interface display 210 includes a share actuator 226. Therefore, the user can actuate share actuator 226 to invoke functionality in content sharing system 122 to generate an interface so user 112 can select recipients and share the document 212 being created with the selected recipient. It can also be seen that content sharing system 122 has generated a sharing user interface display 216. Display 216 includes an "add recipient" actuator 224. When the user actuates actuator 224, the user is taken through an experience in which the user can select recipients with whom the document is to be shared (e.g., the user can scroll through possible receipts, search for them, etc.). Display 216 also has a recipients display portion 218 in which possible recipients are displayed. The display items 220 and 222, representing possible recipients, are illustratively user actuatable elements so that, when actuated by a user (such as when the user clicks on them using a point and click device, using a tap gesture, etc.) the corresponding recipients are selected and added to the recipients to which the content document will be shared.

Figure 5:
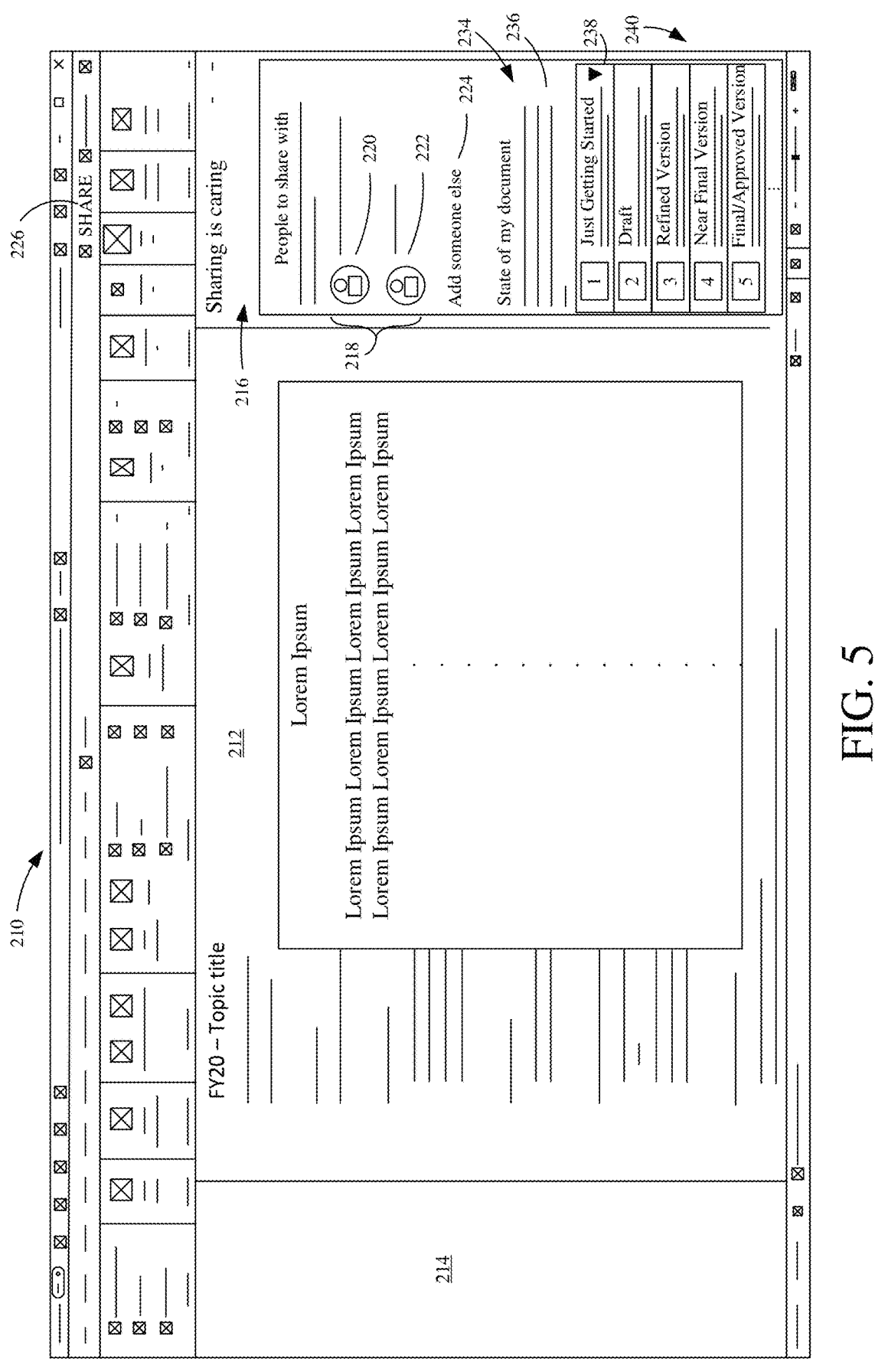

Once content sharing system 122 has been invoked, completeness setting system 166 then controls completeness setting UI generator 178 to generate a completeness setting user interface, with a user input mechanism that allows user 112 to set a completeness level corresponding to the document 212 being created. Determining whether the sharing process has been invoked is indicated by block 230 in the flow diagram of FIG. 3. Controlling the UI system 178 to surface a document completeness UI mechanism is indicated by block 232. FIGS. 4 and 5 show one example of this.

For instance, where sharing functionality 174 has generated the sharing suggestion UI display 216, it also illustratively displays a completeness setting user interface mechanism 234. User interface mechanism 234 illustratively includes a descriptive portion 236 and a completeness setting actuator 238. Completeness setting actuator 238 can be actuated by user 112 in order to set a completeness level corresponding to the content document 212 being generated.

For instance, when user 112 actuates mechanism 238, this may cause completeness setting UI generator 178 to generate a drop down display that allows the user to select any of a variety of different completeness levels. FIG. 5 shows one example of this. Some items in FIG. 5 are similar to those shown in FIG. 4, and they are similarly numbered. However, FIG. 5 also shows that user 112 has now actuated actuator 238. This results in a drop down menu 240 which includes a plurality of user actuatable elements, each corresponding to a different completeness level. The first completeness level labeled number 1 in actuator 238 is entitled "Just Getting Started". It includes a text description portion which states "I've just started the document and wanted you to know about it." Thus, it indicates that the document is in its very initial stages, and that there is no input sought from the recipients. The document is being shared for informational purposes only. The second actuatable element, shown in the example of FIG. 5, is entitled "Draft". The third is entitled "Refined Version". The fourth is entitled "Near Final Version", and the fifth is entitled "Final/Approve Version". Each of these may have corresponding textual portions that will be displayed when the link to the shared document (or the shared document itself) is shared with the recipients.

Once the completeness level is assigned, then the display again appears as that shown in FIG. 4, with actuator 238 being replaced by the selected completeness level (if a different level is chosen using the input mechanisms 240 in FIG. 5). The user 112 can then actuate share actuator 242 to actually share the document, or a link to the document, along with the completeness level that has been assigned to it.

Figure 6:
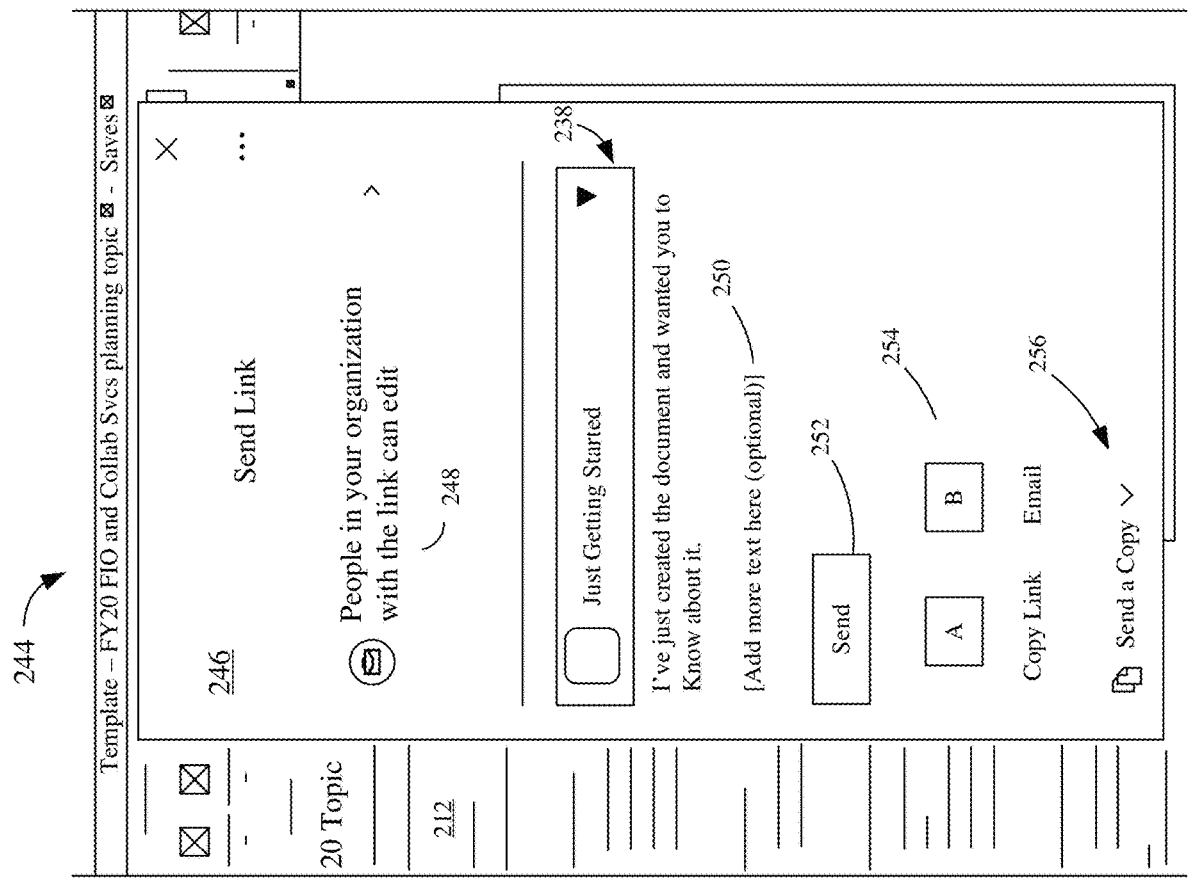

FIG. 6 shows some items that are similar to those shown in FIG. 5, and similar items are similarly numbered. However, the user interface display 244 shown in FIG. 6 has another example of a sharing user interface 246 that can be displayed during a sharing workflow. For example, the user interface display 246 may be generated in response to the user actuating share actuator 226 (shown in FIG. 4).

FIG. 6 shows that the user interface 246 includes a plurality of different user input mechanisms. A first mechanism 248 allows user 112 to select recipients of the document to be shared. Another user input mechanism includes user actuatable input mechanism 238, which is described above with respect to FIG. 4. Briefly, mechanism 238 can be actuated and user 112 can then be taken through an experience that allows the user to select a particular completeness level for the content document 212 being created. In the example shown in FIG. 6, however, mechanism 238 includes another user input mechanism 250. Mechanism 250 is selectable by user 112 so that user 112 can type additional text, describing the completeness level of the content document, describing additional instructions for the recipient, etc. In one example, once the additional text is entered using user input mechanism 250, the additional text will be displayed to a recipient when the document is shared with that recipient, or when it is accessed by the recipient, etc.

FIG. 6 also shows that display 246 includes a send actuator 252 that can be actuated by user 112 to share the content document with the recipient. Similarly, user 112 can actuate any of a number of different actuators 254 which further define the method by which the document will be shared, and actuator 256 which allows the user 112 to attach a copy of the document to the sharing notification or message that will be sent to the recipients.

Figure 7:
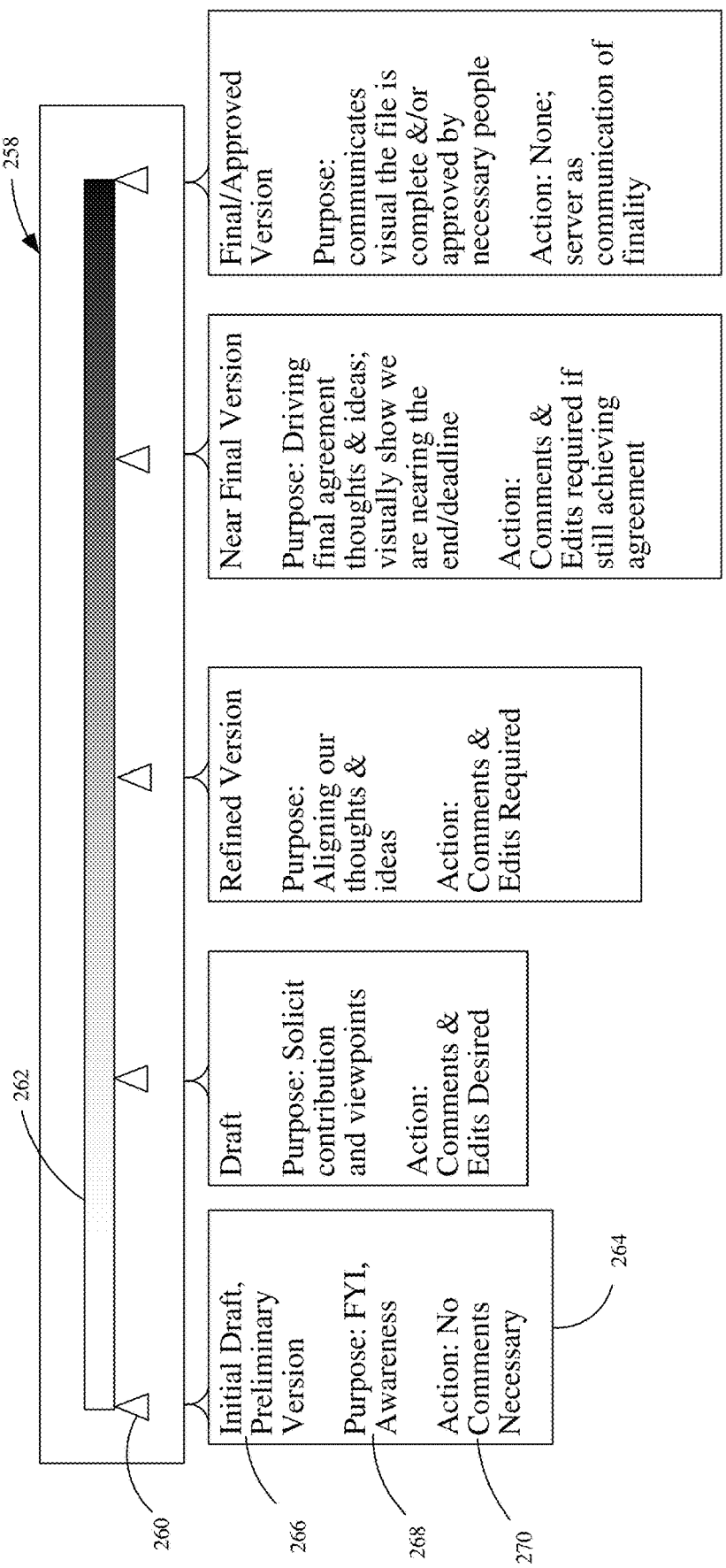

FIG. 7 shows yet another example of a user input mechanism 258 that can be actuated by user 112 in order to set a completeness level corresponding to the document to be shared. FIG. 7 shows that, instead of the drop down actuator 238 shown in FIGS. 4 and 5, the completeness setting user input mechanism can be a slider bar mechanism 258. The slider bar mechanism 258 illustratively has a user actuatable thumb or slider 260. The user can illustratively "grab" and "drag" the thumb to a different position along a slider bar 262. This can be done using a point and click device, a touch gesture, etc. The particular position along slider bar 262 to which the thumb 260 is dragged will correspond to a different completeness level for the document being shared.

In the example shown in FIG. 7, each time thumb 260 is moved to a position that represents a different completeness level, a text bubble 264 can be displayed. The text bubble illustratively includes a textual portion 266 that defines the completeness level, a text portion 268 that defines a purpose for sharing the document, and a text portion 270 that defines expected actions on behalf of the recipient. In one example, as with the actuators in drop down actuator 238 shown in FIG. 5, the text corresponding to the different completeness levels is pre-defined. However, in another example, it may be customizable or user-defined as well. In yet another example, a set of default textual information may be provided, but that information may be configurable or customizable or changed, by the user, by an administrative user, etc.

Thus, returning again to the flow diagram of FIG. 3, the document completeness user interface mechanism can be a slider bar mechanism 258, a drop down actuator 238. It can include pre-defined completeness indicia 274 (such as pre-defined text, etc.). It can include configurable or customizable completeness indicia 276, or it can be generated in a wide variety of other ways 278.

User interaction detector 180 (shown in FIG. 2) illustratively detects user interaction with the completeness user interface mechanism. This is indicated by block 280 in the flow diagram of FIG. 3. For instance, it may detect the user actuating drop down actuator 238 and then selecting one of the actuatable elements 240. It may detect user 112 sliding thumb 260 along slider bar 262. It may detect user 112 inputting configurable or customizable indicia, or it may detect other user interactions.

Based on those user interactions, completeness setting system 166 assigns the document to be shared a completeness level. This is indicated by block 282. This can be done in a wide variety of different ways. For instance, a completeness indicator, indicating the assigned completeness level, can be stored as a part of the document itself. This is indicated by block 284 in the flow diagram of FIG. 3. For instance, it can be stored as a property 136 of a content document 132, on computing system 102 (shown in FIG. 1). In another example, a completeness indicator indicating the assigned completeness level can be stored as metadata corresponding to the document being shared. This is indicated by block 286. For instance, again referring to FIG. 1, it can be stored as metadata 140 corresponding to a content document 132 that is to be shared. The completeness level can be assigned to the document in a wide variety of other ways as well, and this is indicated by block 288 in the flow diagram of FIG. 3.

If there are additional sharing user interface mechanisms that need to be surfaced for user 112, in order for the document to be shared, then content sharing system 122 surfaces those user interface mechanisms for interaction by user 112. Surfacing those user interface mechanisms is indicated by block 290 in the flow diagram of FIG. 3. For instance, some of the additional user interface mechanisms may be surfaced along with the completeness UI mechanism, or they can be surfaced separately. This is indicated by block 292. FIGS. 4-6, for instance, show that user input mechanisms for selecting recipients can be surfaced along with the completeness level setting user input mechanism.

These can be surfaced separately as well. Some of the additional sharing user interface mechanisms can be the recipient identifying mechanisms 294, the "send" mechanism 296, or a wide variety of other user interface mechanisms 298. Again, those mechanisms can be surfaced all at the same time. They can be surfaced sequentially. They can be surfaced in groups, etc.

User interaction detector 180 then detects user interaction with any additional sharing UI mechanisms that have been surfaced. This is indicated by block 300 in the flow diagram of FIG. 3.

Eventually, in order to share the document, user 112 will actuate the "share" or "send" actuator (such as actuator 242 shown in FIG. 4 or actuator 252 shown in FIG. 7). Content sharing system 122 then shares the document with the identified recipients. It will be shared along with the completeness indicator that indicates the document completeness level. This is indicated by block 302. As discussed above, the completeness indicator can be shared along with a message or notification to the recipient indicating that the document has been shared. The completeness indicator can be shared when the document is accessed by the recipient, or it can be shared in other ways.

After the document is shared, it may be that author 112 continues to author or create the content document. This is indicated by block 304 in the flow diagram of FIG. 3. If so, processing reverts to block 190. If not, then the process is completed.

Figure 8:
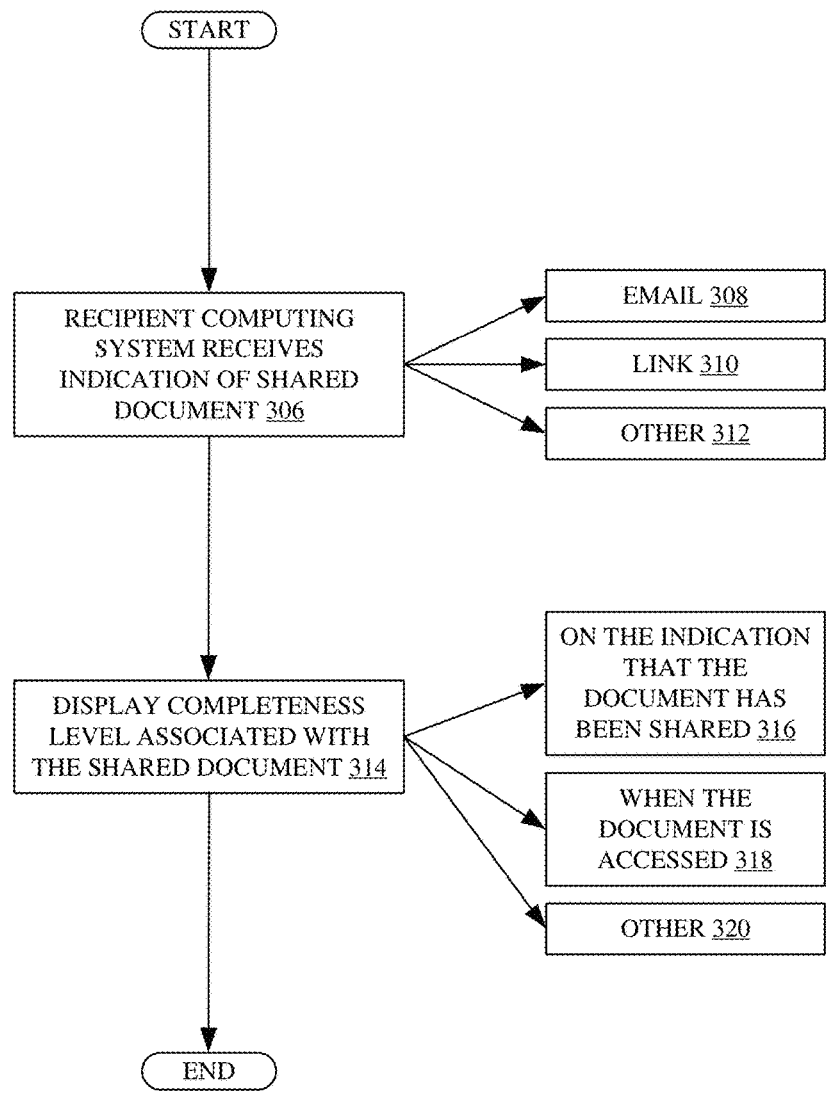
FIG. 8 is a flow diagram illustrating one example of the operation of a recipient computing system in displaying the completeness level corresponding to a shared document.

FIG. 8 is a flow diagram illustrating one example of the operation of shared content processing system 168 and shared content display generator 182 in processing a message or document once it is shared. For instance, assume now that user 112 is a recipient of a shared document from user 116. In that case, shared content processing system 168 detects that a document has been shared with user 112. The recipient computing system (in this case user computing system 104) receives an indication of the shared document. This is indicated by block 306 in the flow diagram of FIG. 8. The indication that a document has been shared may be an e-mail message as indicated by block 308, the e-mail message or other notification may include a link 310, or it can be a wide variety of other indications that the document has been shared. This is indicated by block 312.

Shared content processing system 168, at some point, controls shared content display generator 182 to display the completeness level assigned to, or associated with, the shared document. This is indicated by block 314 in the flow diagram of FIG. 8. As discussed above, the completeness level can be shared on the indication (e.g., the e-mail message or other notification) that the document has been shared. This is indicated by block 316. It can be displayed when the document is opened, or otherwise accessed by the recipient. This is indicated by block 318. The completeness level assigned to the shared document can be displayed in a wide variety of other ways as well, and this is indicated by block 320. When it is displayed, it will also illustratively display the text which corresponds to the completeness level. The text may include instructions, a description of the completeness level, a description of the purpose for which the document was shared, among other things.

It can thus be seen that the completeness level mechanisms improve the processing of the computing system itself. It simplifies and expedites communicating the status of a document draft. The sender need not type a relatively long explanation to the recipients. Instead, the present description makes it extremely easy and quick to select a completeness level and the corresponding descriptions and instructions are automatically assigned to the document and sent along with the indication that the document has been shared. The present description also provides for a configurable or customizable system in which the completeness levels can be modified. This also greatly reduces barriers to sharing files and documents because it indicates the completeness level of the document, so that the expectations of the recipients are managed.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 9:
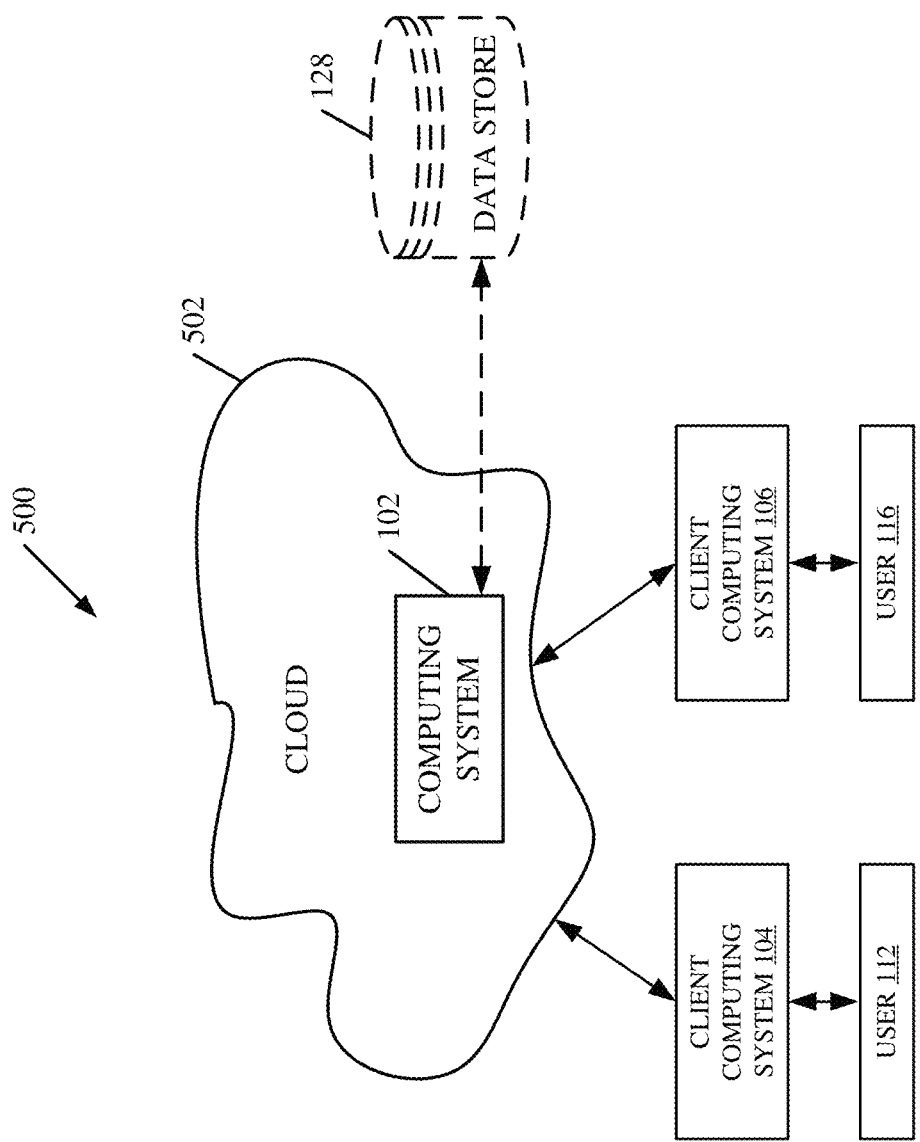
FIG. 9 is a block diagram showing one example of the architecture shown in FIG. 1, deployed in a cloud computing architecture.

FIG. 9 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various examples, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 9, some items are similar to those shown in FIG. 1 and they are similarly numbered. FIG. 9 specifically shows that computing system 102 can be located in cloud 502 (which can be public, private, or a combination where portions are public while others are private). Therefore, users 112 and 116 use user devices and client computing systems 104 and 106, respectively, to access those systems through cloud 502.

FIG. 9 also depicts another embodiment of a cloud architecture. FIG. 9 shows that it is also contemplated that some elements of computing system 102 can be disposed in cloud 502 while others are not. By way of example, data store 128 can be disposed outside of cloud 502, and accessed through cloud 502. Regardless of where they are located, they can be accessed directly by devices, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 10:
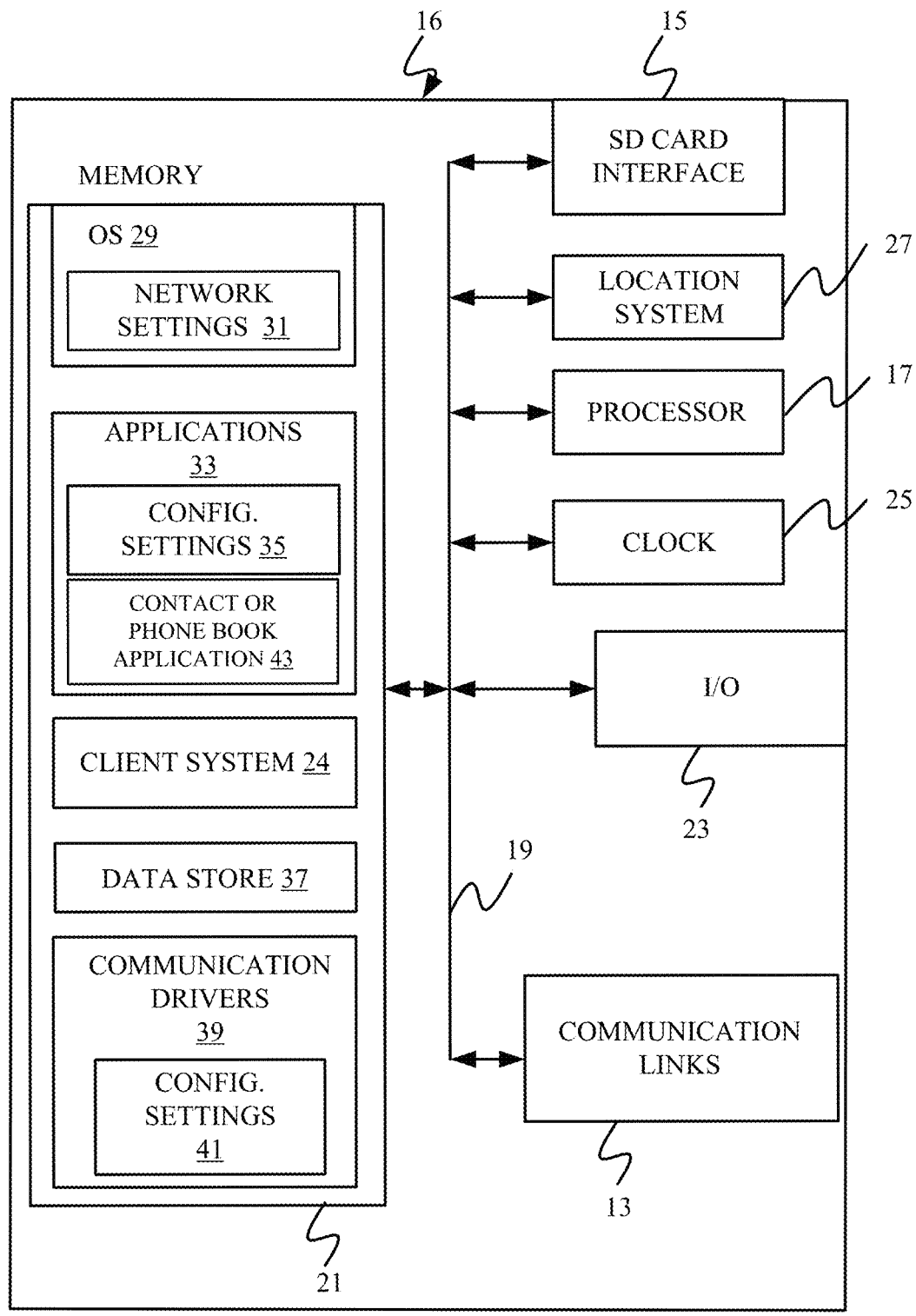
FIGS. 10-12 show examples of mobile devices that can be used in the architectures shown in the previous figures.
Figure 11:
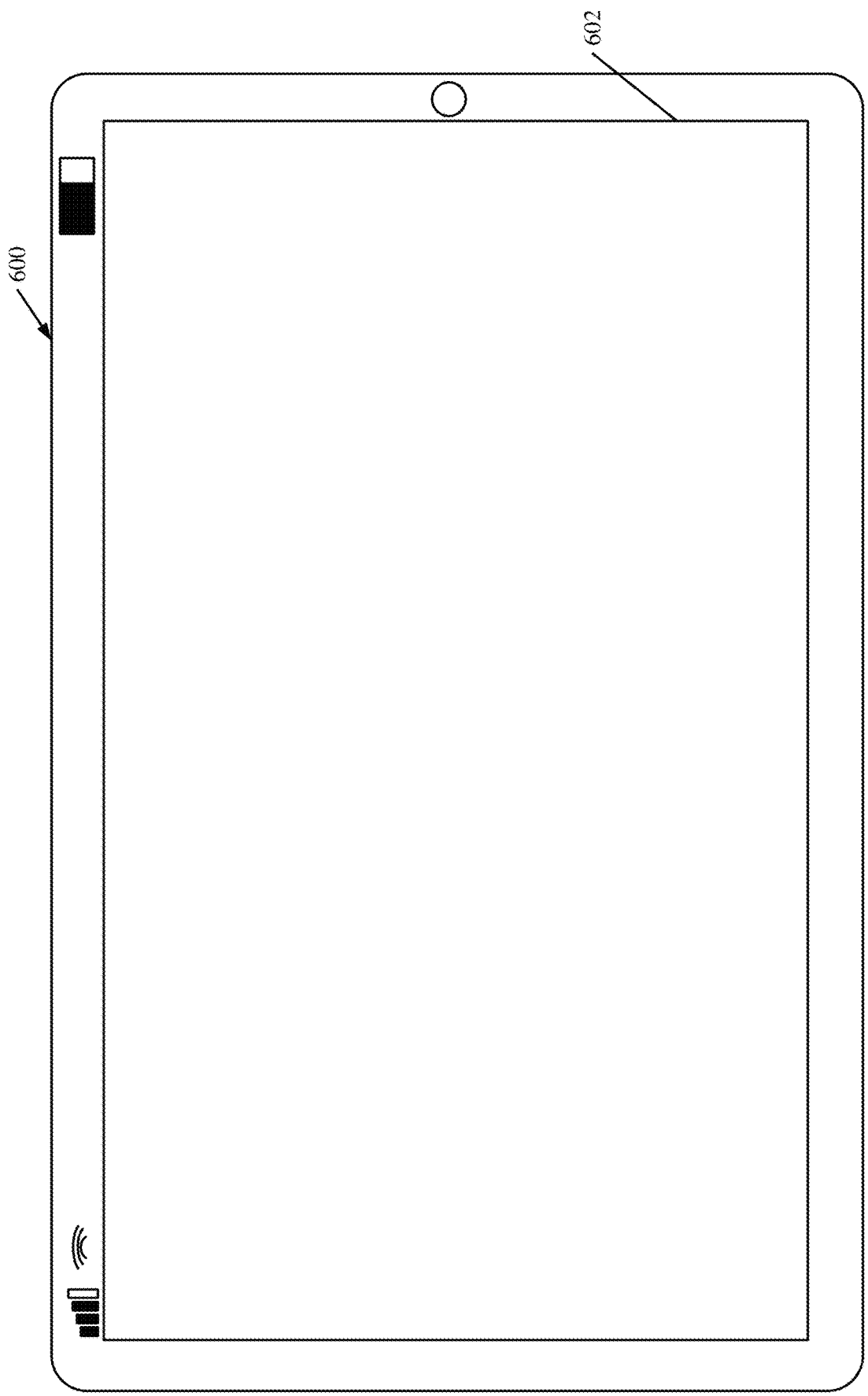
Figure 12:
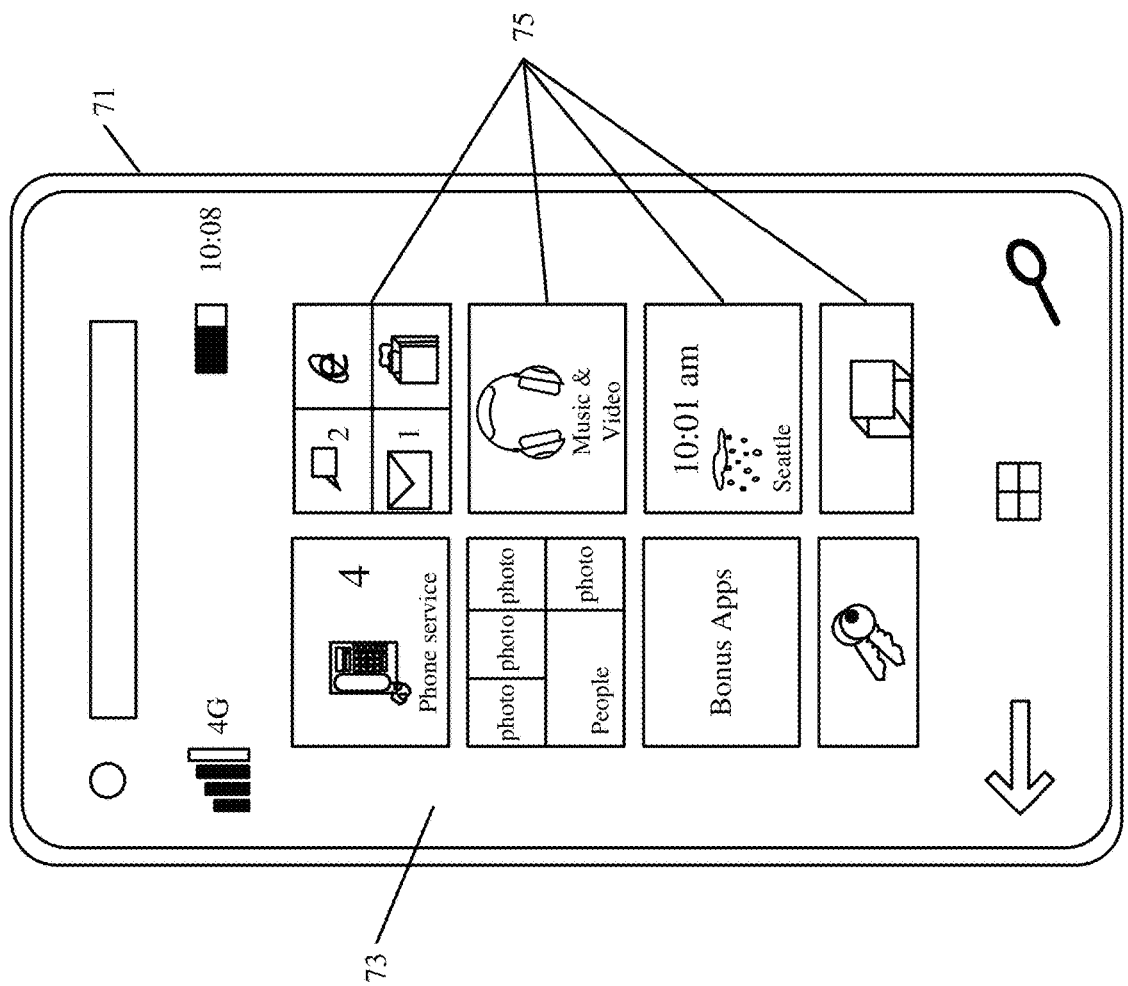
Figure 13:
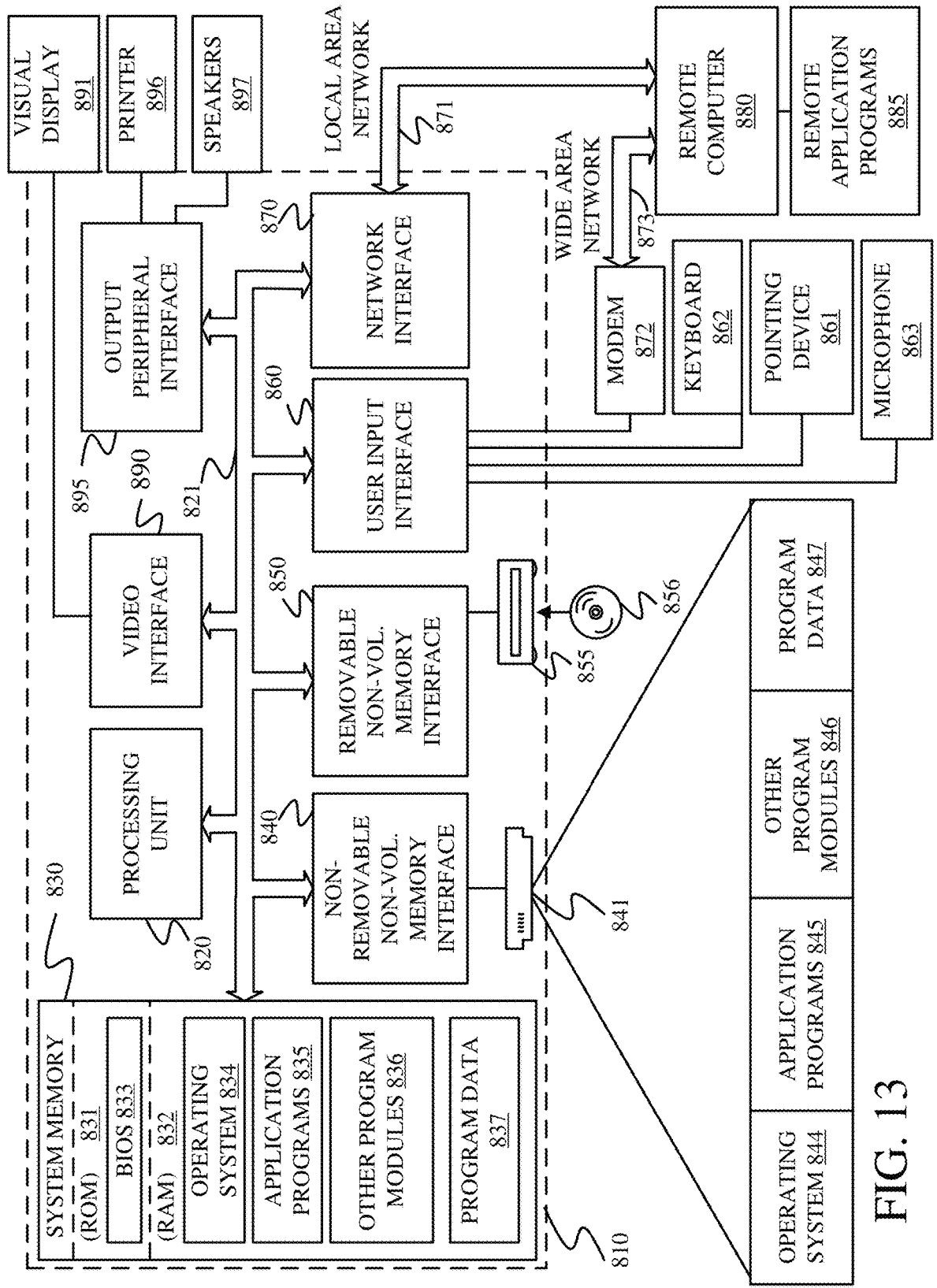
FIG. 13 is a block diagram showing one example of a computing environment that can be used in the architectures shown in the previous figures.

FIG. 10 is a simplified block diagram of one illustrative example of a handheld or mobile computing device that can be used as a user's or client's hand held device 16, in which the present system (or parts of it) can be deployed. FIGS. 11-12 are examples of handheld or mobile devices.

FIG. 10 provides a general block diagram of the components of a client device 16 that can run components computing system 102 client computing systems 104-106 that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1xrtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors or servers from other FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 10 shows one example in which device 16 is a tablet computer 600. In FIG. 10, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 11 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

FIG. 12 is one example of a computing environment in which architecture 100, or parts of it, (for example) can be deployed. With reference to FIG. 12, an example system for implementing some embodiments includes a general-purpose computing device in the form of a computer 810. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 12.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 12 illustrates operating system 834, application programs 835, other program modules 836, and program data 837.

The computer 810 may also include other removable/non-removable volatile/nonvolatile computer storage media. By way of example only, FIG. 12 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 12, provide storage of computer readable instructions, data structures, program modules and other data for the computer 810. In FIG. 12, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 12 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 12 illustrates remote application programs 885 as residing on remote computer 880. It will be appreciated that the network connections shown are exemplary and other means of establishing a communications link between the computers may be used.

It should also be noted that the different examples described herein can be combined in different ways. That is, parts of one or more examples can be combined with parts of one or more other examples. All of this is contemplated herein.

Example 1 is a computing system, comprising:
a user interface system that generates a representation of a user interface and detects user interaction with the user interface;
a content creation system that receives a user content creation input and generates a content document based on the user content creation input; and
a completeness setting system that controls the user interface system to generate a representation of a completeness level setting user interface with a completeness level setting user input mechanism and receive a completeness indication indicative of a user interaction with the completeness level setting user input mechanism and to assign, to the content document, a completeness level indicated by the completeness indication; and
a sharing system that, in response to a user sharing input, shares the content document with a recipient, along with the assigned completeness level.

Example 2 is the computing system of any or all previous examples wherein the completeness level setting user input mechanism is actuatable to be set to one of a plurality of different completeness levels, each completeness level having a corresponding textual display portion describing the completeness level.

Example 3 is the computing system of any or all previous examples wherein the completeness level setting user input mechanism is actuatable to set one of the plurality of different completeness levels, each completeness level having a corresponding action display portion describing an action requested of the recipient.

Example 4 is the computing system of any or all previous examples wherein the sharing system generates a recipient identifier mechanism actuated to identify the recipient, on the completeness level setting user interface.

Example 5 is the computing system of any or all previous examples wherein the plurality of different completeness levels are predefined completeness levels, each with a predefined corresponding text portion.

Example 6 is the computing system of any or all previous examples and further comprising:

a completeness setting configuration system configured to generate a representation of a configuration user interface with a configuration input mechanism, the configuration input mechanism being actuatable to configure the plurality of different completeness levels that are selectable using the completeness level setting user input mechanism.

Example 7 is the computing system of any or all previous examples wherein the completeness setting system is configured to control the user interface system to generate the completeness level setting user input mechanism as a drop down mechanism that, when actuated, displays a plurality of different selectable completeness level actuators, each corresponding to a different completeness level.

Example 8 is the computing system of any or all previous examples wherein the completeness setting system is configured to control the user interface system to generate the completeness level setting user input mechanism as a slider bar that, when actuated, displays a slider that is movable to a plurality of different selectable positions, each corresponding to a different completeness level.

Example 9 is the computing system of any or all previous examples wherein the completeness setting system is configured to assign the completeness level to the content document by storing the completeness level as a property of the content document.

Example 10 is the computing system of any or all previous examples wherein the completeness setting system is configured to assign the completeness level to the content document by storing the completeness level as metadata corresponding to the content document.

Example 11 is a computer implemented method, comprising:

receiving a user content creation input;
generating a content document based on the user content creation input;
controlling a user interface system to generate a representation of a completeness level setting user interface with a completeness level setting user input mechanism;
receiving a completeness indication indicative of a user interaction with the completeness level setting user input mechanism;
assigning, to the content document, a completeness level indicated by the completeness indication; and
sharing the content document with a recipient, along with the assigned completeness level.

Example 12 is the computer implemented method of any or all previous examples and wherein controlling the user interface system comprises:

controlling the user interface system to generate the completeness level setting user input mechanism that displays an expected action textual display describing an action expected by the recipient in response to having the content document shared.

Example 13 is the computer implemented method of any or all previous examples wherein controlling the user interface system comprises:

generating a recipient identifier mechanism on the completeness setting user interface, that is actuated to identify the recipient.

Example 14 is the computer implemented method of any or all previous examples wherein the completeness level setting user input mechanism is actuatable to be set to one of a plurality of different completeness levels, each completeness level having a corresponding textual display portion describing the completeness level.

Example 15 is the computer implemented method of any or all previous examples and further comprising:

generating a representation of a configuration user interface with a configuration input mechanism, the configuration input mechanism being actuatable to configure the plurality of different completeness levels that are selectable using the completeness level setting user input mechanism.

Example 16 is the computer implemented method of any or all previous examples wherein controlling the user interface system comprises:

controlling the user interface system to generate the completeness level setting user input mechanism as a drop down mechanism that, when actuated, displays a plurality of different selectable completeness level actuators, each corresponding to a different completeness level.

Example 17 is the computer implemented method of any or all previous examples wherein controlling the user interface system comprises:

controlling the user interface system to generate the completeness level setting user input mechanism as a slider bar that, when actuated, displays a slider that is movable to a plurality of different selectable positions, each corresponding to a different completeness level.

Example 18 is the computer implemented method of any or all previous examples wherein assigning the completeness level comprises:

storing the completeness level as a property of the content document.

Example 19 is the computer implemented method of any or all previous examples wherein assigning the completeness level comprises:

storing the completeness level as metadata corresponding to the content document.

Example 20 is a computing system, comprising:
a processor; and
a data store that stores instructions that are executed by the processor to perform steps, comprising:
receiving user content creation inputs;
generating a content document based on the user content creation inputs;
controlling a user interface system to generate a representation of a completeness level setting user interface with a completeness level setting user input mechanism;
receiving a completeness indication indicative of a user interaction with the completeness level setting user input mechanism;
assigning, to the content document, a completeness level indicated by the completeness indication; and
sharing the content document with a recipient, along with the assigned completeness level.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
   at least one processor; and
   memory storing instructions executable by the at least one processor, wherein the instructions, when executed, cause the computing system to:
   generate a representation of a user interface comprising:
   an authoring pane that represents a content document;
   a content creation user input mechanism configured to generate content in the content document in the authoring pane;
   a sharing pane including a recipient selection user input mechanism configured to select one or more recipients for the content document in the authoring pane; and
   a completeness level setting user input mechanism configured to assign a completeness level for the content document in the authoring pane, wherein the user interface is configured to simultaneously display the completeness level setting user input mechanism with the authoring pane;
   based on an indication of a user content creation input through the content creation user input mechanism, generate a portion of content in the content document;
   based on an indication of a user completeness level user input through the completeness level setting user input mechanism, assign the completeness level to the content document;
   based on an indication of a recipient selection input through the recipient identifier user input mechanism, select a particular recipient for the content document; and
   in response to a user sharing input, share the content document with the particular recipient, along with the assigned completeness level.

2. The computing system of claim 1 wherein the completeness level setting user input mechanism is actuatable to be set to one of a plurality of different completeness levels, each completeness level having a corresponding textual display portion describing the completeness level.

3. The computing system of claim 2 wherein the completeness level setting user input mechanism is actuatable to set one of the plurality of different completeness levels, each completeness level having a corresponding action display portion describing an action requested of the recipient.

4. The computing system of claim 2, wherein the instructions, when executed, cause the computing system to:
   generate a representation of a configuration user interface with a configuration input mechanism, the configuration input mechanism being actuatable to configure the plurality of different completeness levels that are selectable using the completeness level setting user input mechanism.

5. The computing system of claim 1 wherein the completeness level setting user input mechanism is provided on the sharing pane along with the recipient identifier user input mechanism.

6. The computing system of claim 5, wherein
   plurality of different completeness levels comprise predefined completeness levels, each with a predefined corresponding text portion, and
   the user interface is configured to simultaneously display the sharing pane along with the authoring pane.

7. The computing system of claim 1 wherein the instructions, when executed, cause the computing system to generate the completeness level setting user input mechanism as a drop down mechanism that, when actuated, displays a plurality of different selectable completeness level actuators, each corresponding to a different completeness level.

8. The computing system of claim 1 wherein the instructions, when executed, cause the computing system to generate the completeness level setting user input mechanism as a slider bar that, when actuated, displays a slider that is movable to a plurality of different selectable positions, each corresponding to a different completeness level.

9. The computing system of claim 1 wherein the instructions, when executed, cause the computing system to assign the completeness level to the content document by storing the completeness level as a property of the content document.

10. The computing system of claim 1 wherein the instructions, when executed, cause the computing system to assign the completeness level to the content document by storing the completeness level as metadata corresponding to the content document.

11. A computer implemented method, comprising:
    generating a representation of a user interface comprising:
    an authoring pane that includes a content document;
    a recipient identifier mechanism; and
    a completeness level setting user interface with a completeness level setting user input mechanism, wherein the user interface is configured to simultaneously display the completeness level setting user input mechanism with the authoring pane;
    receiving a user content creation input;
    generating a content item in the content document based on the user content creation input;
    identifying a recipient for the content document in the authoring pane based on actuation of the recipient identifier mechanism;
    receiving a completeness indication indicative of a user interaction with the completeness level setting user input mechanism;
    assigning, to the content document in the authoring pane, a completeness level indicated by the completeness indication; and
    sharing the content document with the recipient, along with the assigned completeness level.

12. The computer implemented method of claim 11 and wherein controlling the user interface system comprises:
    controlling the user interface system to generate the completeness level setting user input mechanism that displays an expected action textual display describing an action expected by the recipient in response to having the content document shared.

13. The computer implemented method of claim 11 wherein the completeness level setting user input mechanism is actuatable to be set to one of a plurality of different completeness levels, each completeness level having a corresponding textual display portion describing the completeness level.

14. The computer implemented method of claim 13 and further comprising:
    generating a representation of a configuration user interface with a configuration input mechanism, the configuration input mechanism being actuatable to configure the plurality of different completeness levels that are selectable using the completeness level setting user input mechanism.

15. The computer implemented method of claim 11 wherein controlling the user interface system comprises:
controlling the user interface system to generate the completeness level setting user input mechanism as a drop down mechanism that, when actuated, displays a plurality of different selectable completeness level actuators, each corresponding to a different completeness level.

16. The computer implemented method of claim 11 wherein controlling the user interface system comprises:
controlling the user interface system to generate the completeness level setting user input mechanism as a slider bar that, when actuated, displays a slider that is movable to a plurality of different selectable positions, each corresponding to a different completeness level.

17. The computer implemented method of claim 11 wherein assigning the completeness level comprises:
storing the completeness level as at least one of:
a property of the content document, or
metadata corresponding to the content document.

18. A computing system, comprising:
a processor; and
a data store that stores instructions that are executed by the processor to perform steps, comprising:
generating a representation of an authoring pane that includes a content document;
receiving user content creation inputs;
generating content in the content document based on the user content creation inputs;
controlling a user interface system to generate a representation of a completeness level setting user interface and to simultaneously display the completeness level setting user interface with the authoring pane, the completeness level setting user interface including a completeness level setting user input mechanism configured to assign a completeness level for the content document in the authoring pane;
receiving a completeness indication indicative of a user interaction with the completeness level setting user input mechanism;
assigning, to the content document, the completeness level indicated by the completeness indication by at least one of:
storing the completeness level as a property of the content document; or storing the completeness level as metadata corresponding to the content document; and
sharing the content document with a recipient, along with the assigned completeness level.

\* \* \* \* \*